United States Patent
Kazmi

(10) Patent No.: US 8,422,384 B2
(45) Date of Patent: Apr. 16, 2013

(54) METHOD AND ARRANGEMENT IN COMMUNICATION NETWORKS

(75) Inventor: Muhammad Ali Kazmi, Bromma (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 482 days.

(21) Appl. No.: 12/597,667

(22) PCT Filed: Apr. 28, 2008

(86) PCT No.: PCT/EP2008/003428
§ 371 (c)(1),
(2), (4) Date: Oct. 28, 2009

(87) PCT Pub. No.: WO2008/131950
PCT Pub. Date: Nov. 6, 2008

(65) Prior Publication Data
US 2010/0135175 A1    Jun. 3, 2010

(30) Foreign Application Priority Data
Apr. 30, 2007 (SE) .................................. 0701040

(51) Int. Cl.
*H04L 12/26* (2006.01)

(52) U.S. Cl.
USPC ........................... 370/252; 370/311; 370/329

(58) Field of Classification Search .................. 370/252, 370/230, 311, 322, 318, 432, 345, 329–335; 455/3.01, 561, 522, 458, 456.1
See application file for complete search history.

(56) References Cited

U.S. PATENT DOCUMENTS

| | | | |
|---|---|---|---|
| 7,248,883 B2 * | 7/2007 | Cuffaro | 455/456.1 |
| 7,295,856 B2 * | 11/2007 | Agin | 455/522 |
| 7,321,570 B2 * | 1/2008 | Ratasuk et al. | 370/318 |
| 7,706,318 B2 * | 4/2010 | Lee et al. | 370/322 |
| 7,796,938 B2 * | 9/2010 | Nishio et al. | 455/3.01 |
| 7,881,191 B2 * | 2/2011 | Liu et al. | 370/230 |
| 7,974,231 B2 * | 7/2011 | Ishii et al. | 370/318 |
| 2003/0156561 A1 * | 8/2003 | Padovani et al. | 370/335 |
| 2005/0085254 A1 * | 4/2005 | Chuah et al. | 455/522 |
| 2005/0099968 A1 * | 5/2005 | Yamano | 370/311 |
| 2006/0146858 A1 * | 7/2006 | Kim | 370/432 |

(Continued)

FOREIGN PATENT DOCUMENTS

JP        200642127 A      2/2006

OTHER PUBLICATIONS

Carstens, J. "3Gplus Broadcast/Streaming Quality Target Signaling for Giving .carte blanche' to UE." ip.com Journal, Siemens AG, Jan. 15, 2007.

*Primary Examiner* — Michael Thier
*Assistant Examiner* — Vincelas Louis
(74) *Attorney, Agent, or Firm* — Coats & Bennett, P.L.L.C.

(57) ABSTRACT

The present invention relates to apparatus and methods for communicating on two or more services or transport channels by a multi-branch receiver and for dynamically reconfiguring the multi-branch receiver. The dynamic reconfiguration of the multi-branch receiver may be based on at least one of the measured radio conditions, measured quality of the services, and network-controlled quality of service targets. For each of the services or transport channels, a measured quality target is derived from the network-controlled quality of service targets. Based on the largest of the measured quality targets, one or more of the branches of the receiver is dynamically switched on or off.

15 Claims, 4 Drawing Sheets

U.S. PATENT DOCUMENTS

| | | |
|---|---|---|
| 2006/0165156 A1 | 7/2006 | Kanemoto et al. |
| 2007/0183388 A1* | 8/2007 | Breuer et al. .................. 370/345 |
| 2008/0056170 A1* | 3/2008 | Komulainen et al. ......... 370/311 |
| 2008/0220819 A1* | 9/2008 | Ben-Eli .......................... 455/561 |
| 2008/0268878 A1* | 10/2008 | Wang et al. ................... 455/458 |
| 2010/0067419 A1* | 3/2010 | Liu et al. ....................... 370/311 |
| 2010/0226274 A1* | 9/2010 | Burbidge et al. ............. 370/252 |

* cited by examiner

METHOD AND ARRANGEMENT IN COMMUNICATION NETWORKS

TECHNICAL FIELD

The present invention relates to a user equipment and a method for simultaneously receiving at least two services or transport channels.

BACKGROUND OF THE INVENTION

The user equipment (UE) can employ multiple receiver branches irrespective of the access technology or radio interface design. Typically there can be two receiver branches at the UE. This is commonly termed as receiver diversity. There are several benefits such as cell coverage is extended, efficient use of transmitted power at the base station etc. In Additive White Gaussian Noise (AWGN) two receiver branches can boost the system capacity by 3 dB. However, multiple branches at the UE can also drain more power, thereby reducing the UE talk or usage time in some scenarios. Therefore, in scenarios where receiver diversity does not lead to any system gain, it is advantageous from UE battery perspective to switch off its additional receiver branches.

The receiver diversity comprising of two receiver branches at the UE is being used in WCDMA. In the standard, receiver diversity is a UE capability and it is ensured by specifying UE receiver requirements and is called enhanced performance requirements type 1.

The receiver diversity (or type 1 requirements) is specified for number of scenarios in terms of downlink physical channels. The scenarios employing the receiver diversity include HSDPA, MBMS, DCH and Enhanced Uplink (EUL) downlink channels. The physical channels that currently use receiver diversity are: HS-PDSCH and HS-SCCH for HSDPA scenario, DPCH and DPCCH for DCH scenario, MTCH for MBMS scenario and E-RGCH, E-HICH and E-AGCH for EUL scenario.

In E-UTRAN, receiver diversity at the UE is likely to be employed as the minimum requirements or a mandatory feature. Thus an E-UTRAN UE will use at least two receiver branches to receive all channels in all scenarios.

As mentioned above one implication of receiver diversity is increase in power consumption in some scenarios but not all. In such scenarios, where UE power consumption increases and network does not sufficiently benefit from having receiver diversity active all the time, it is advantageous from UE perspective to switch off one of its receiver branches if radio conditions are favorable. On the other hand the UE should switch on both receiver branches when radio conditions deteriorate. This switching on and off of receiver diversity in response to the radio conditions is called dynamic reconfiguration of UE enhanced receiver in 3GPP terminology.

In principle, dynamic reconfiguration concept can be utilized by the UE in all scenarios. However, in some scenarios there is an advantage from the network perspective that UE keeps its receiver diversity on all the time during a session. For instance in HSDPA scenario the channel dependent scheduling makes use of favorable radio conditions to increase user throughput. With the introduction of receiver diversity at the UE, the channel dependent scheduling in good radio conditions will further improve the user throughput. In addition high data rate transmission during a scheduling turn would require UE with receiver diversity on all the time, to be scheduled less often as compared to the one with single branch. Therefore, the average UE power consumption may not significantly increase in HSDPA scenario when receiver diversity is active consistently.

In 3GPP, point to multipoint MBMS scenario has been identified, where the dynamic reconfiguration of enhanced receiver in good radio conditions does not adversely impact the system performance. This is due to the fact that point to multipoint MBMS delivery is carried out by fixed transmission power level. This means that, when the UE moves close to the base station, or when it enters in good radio conditions, the UE can switch off its enhanced receiver (i.e. one of its branches), while still maintaining an adequate reception quality of the desired MBMS service.

From a network perspective, the desired quality of service should be fulfilled irrespective of whether UE receiver diversity is switched on or off. Therefore network is to signal the quality target in terms of BLER or SDU error rate to the UE even in point to multipoint MBMS scenario. This will eventually be used by the receiver reconfiguration algorithm at the UE. The exact algorithm is UE implementation dependent allowing the UE to autonomously switch on or off its receiver diversity.

In order to understand the switching algorithm, the following variables can be considered:

Measured quality: $Q_M$
Adjusted target quality: $Q_T$
Measured BLER: $BLER_M$

The measured quality $Q_M$ is measured by the UE based on some known signals such as CPICH in WCDMA. Some examples of measured quality are CPICH RSCP, CPICH Ec/No, SINR, etc. The exact quantity chosen by the UE is implementation dependent.

The adjusted target quality $Q_T$ is adjusted by the UE autonomously in accordance with the measured $BLER_M$ and its comparison with the target $BLER_T$. The exact derivation and adjustment of the $Q_T$ is thus implementation dependent. But for the sake of clarity the interpretation $Q_T$ in this description is that it is increased by certain amount when measured BLER ($BLER_M$) is lower than the target BLER ($BLER_T$), otherwise it is decreased by certain amount.

The dynamic reconfiguration will work as follows:
IF $Q_M > Q_T$
UE switches to single receiver branch
ELSE (i.e. $Q_M \leq Q_T$)
UE switches to dual receiver branches The UE capabilities for MBMS reception are specified in for example 3GPP TS 25.306, "UE Radio Access capabilities". First of all more than one MBMS traffic channel (MTCH) that carries MBMS service can be mapped on to one physical channel (S-CCPCH) with a certain spreading factor. Secondly, a UE can receive more than one MTCH (i.e. more than one point to multipoint MBMS service at a time). The dynamic receiver reconfiguration should not degrade the received quality of any of all the services received by user.

In the current system, the underlying assumption is that user at a time is receiving one point to multipoint MBMS service, which is mapped onto one MTCH channel. Therefore the decision of the dynamic receiver reconfiguration is based on the measured quality of one particular service. In that case the switching principle stated previously is sufficient to ensure that the desired quality target is maintained. Reception of one service at a time is usual case.

However, in practice a user may intend to receive simultaneously more than one service, for example watching a football match and scanning weather forecast etc. In that case, the user will receive more than one MTCH, which may be multiplexed onto the same physical channel (i.e. S-CCPCH). Furthermore, the quality of service requirements of different services may be different. In addition, the physical channel configuration, by which we mean modulation, coding, rate matching etc., may significantly differ on different types of channels. However the algorithm described previously does not describe how the UE will dynamically reconfigure its enhanced receiver when it is actively receiving multiple services at a time.

SUMMARY OF THE INVENTION

Thus, one object of the present invention is to solve above mentioned problems.

Thus, the invention according to a first embodiment relates to a method in a user equipment of simultaneously receiving at least two services or transport channels, using a receiver with at least two receiver branches, and dynamically reconfiguring its receiver by switching on or off at least one of the receiver branches for the reception of the services. The dynamic reconfiguration is based on the measured radio conditions, network controlled quality of service targets of the said services and the measured quality of the said service. The method comprises, the additional steps of deriving the measured quality target from the network controlled quality of service for all simultaneously received services or transport channels, using the largest derived measured quality target for dynamically reconfiguring its receiver.

According to another aspect, the invention provides a user equipment adapted to perform the method.

All the received services or transport channels can be mapped onto the same physical channel. Thus, the derived measured quality target used for dynamic receiver reconfiguration is the maximum of all the measured quality targets.

The received services or transport channels can be mapped onto more than one physical channel and the receiver reconfiguration is independently done on each physical channel. The derived measured quality target used for dynamic receiver reconfiguration on each physical channel is the maximum of all the measured quality targets of the services or transport channels mapped onto on the corresponding physical channel. The receiver reconfiguration may jointly be done on all active physical channels. The derived measured quality target used for dynamic receiver reconfiguration is the maximum of all the measured quality targets of the services or transport channels mapped on all the active physical channels.

Preferably, the services are point to multipoint MBMS services, and the transport channels are MTCH, MCCH or MSCH. The services may also be point to point DCH services and the transport channels are DCCH and DTCH.

Another advantage of the invention is that, in the case where the UE simultaneously receives multiple services (or channels), the dynamic receiver reconfiguration does not degrade the reception quality of any of the received services or channels.

BRIEF DESCRIPTION OF THE DRAWINGS

In the following, the invention is described with reference to a number of illustrated exemplary embodiments, in which.

DETAILED DESCRIPTION OF PREFERRED EMBODIMENTS

Figure 1:
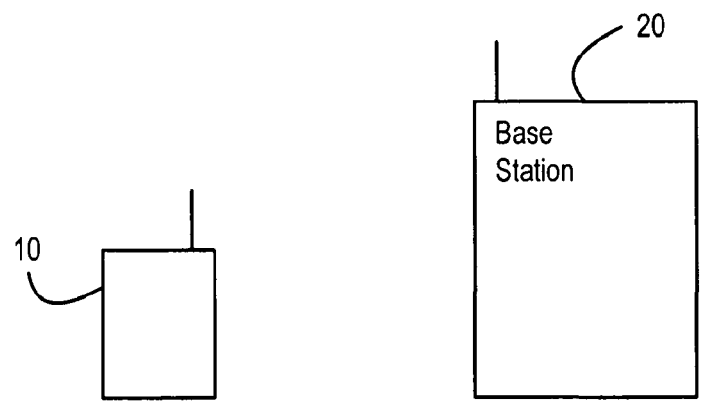
FIG. 1 is a block schematic diagram of a mobile communications network in accordance with the present invention.

FIG. 1 illustrates a mobile communications network, in which a user equipment (UE) 10 is located in the coverage area of a base station 20. As is well known, the user equipment 10 is able to receive signals from the base station 20.

The network operates in accordance with a mobile communications standard, ensuring that the base station transmits data in a format that can be detected by the user equipment. In the described embodiment, the network is an E-UTRAN (Extended UMTS Terrestrial Radio Access Network) network.

In particular, this invention is concerned with the situation where the user equipment 10 is receiving MBMS (Multimedia Broadcast Multicast Service) signals from the base station 20.

Figure 2:
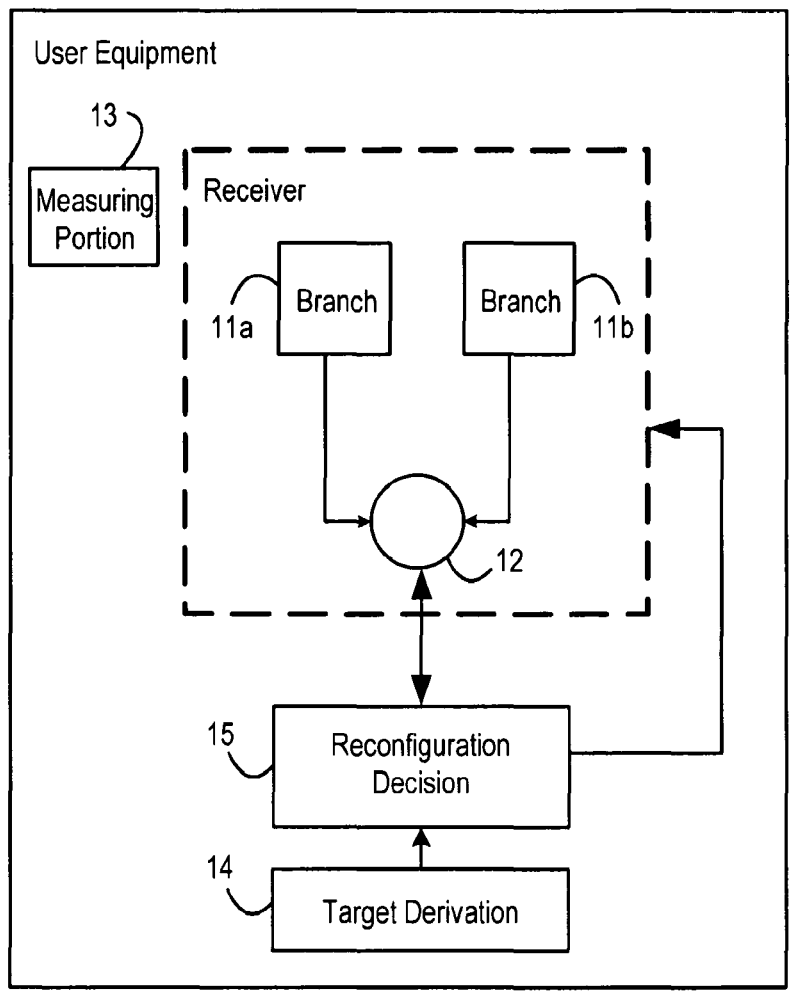
FIG. 2 illustrates in more detail a user equipment in the network of FIG. 1.

The user equipment 10 according to the invention is schematically illustrated in FIG. 2. It will be apparent that a UE is complex, and that FIG. 2 is a schematic representation of the parts that are relevant for an understanding of the invention. The UE includes a receiver 11, having at least two receiver branches 11a, 11b, each of which receives the signals that are received by the UE 10 from the base station 20.

The UE further comprises a reconfiguration arrangement 12 for dynamically reconfiguring the receiver by switching on or off at least one of said receiver branches 11a, 11b for the reception of data. A measuring portion 13 is arranged for measuring radio conditions. The reconfiguration arrangement is operatively arranged to execute the dynamic reconfiguration based on the measured radio conditions, network controlled quality of service targets of the said services and the measured quality of the said service. The UE thus further comprises a target derivation block 14 for deriving the measured quality target from the network controlled quality of service for all simultaneously received services or transport channels, and a reconfiguration decision block 15, which decides using the largest derived measured quality target (as described in more detail below) when to dynamically reconfigure the receiver.

In practice, it will be recognized that the UE a processing unit, memory and communication interfaces (not shown). The functions of many of the functional blocks described above, for example the reconfiguration arrangement 12, target derivation block 14 and reconfiguration decision block 15 may thus be carried out by the processing unit.

When receiving multiple services, the dynamic receiver reconfiguration process performed at the UE attempts to maintain the quality targets of all the active services.

The UE derives the adjusted quality target ($Q_T$) from the network signalled quality of service target (e.g. $BLER_T$) for each active service. The UE then uses the largest adjusted quality target to dynamically reconfigure the enhanced receiver.

In point to multipoint MBMS transmission, multiple services can be mapped onto one Secondary Common Control Physical Channel (S-CCPCH) or they can be mapped onto different physical channels. The network may therefore activate several S-CCPCH if several services are to be offered by the underlying network. This gives rise to the following possibilities, namely that the UE receives multiple services on the same physical channel, or that the UE receives multiple services on different physical channels.

The switching mechanism of the dynamic reconfiguration should cater for all these cases.

Figure 3:
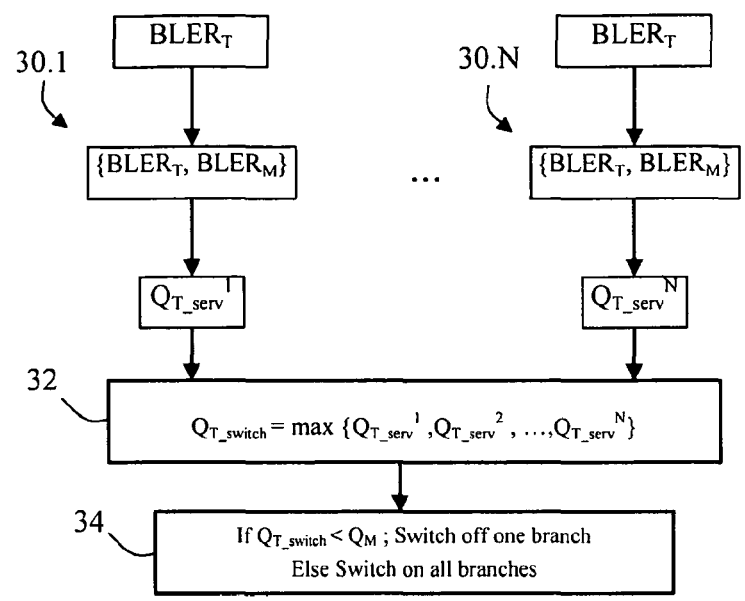
FIG. 3 illustrates dynamic receiver reconfiguration with multiple services according to the present invention.

The most common scenario is that multiple services are received on the same physical channel. The process performed in the UE is illustrated in FIG. 3.

Let us assume that a UE is simultaneously receiving N point to multipoint MBMS services, which are mapped onto the same physical channel. Each service is associated with a target quality of service, for example a block error rate (BLER) or service data unit (SDU) error rate, and these are signalled to the UE by the network.

In this scenario the UE shall derive the quality target to be used for the switching algorithm according to the following process.

Firstly, in steps 30.1, ..., 30.N respectively, the UE sets for each of the services $serv^1, \ldots, serv^N$ a respective quality target $Q_{T\_serv}^1, \ldots, Q_{T\_serv}^N$.

The respective quality targets for the different services are set by the UE according to its implementation. For example, the targets can be set by measuring the BLER and comparing the measured value with the target BLER. The exact derivation and adjustment of the quality target for each service is implementation dependent. But in this description, it is assumed that the quality target is increased by a certain amount when the measured BLER ($BLER_M$) is lower than the target BLER ($BLER_T$), and otherwise is decreased by certain amount.

In step 32, the UE sets the overall quality target $Q_{T\_switch}$ from the quality targets for each individual service, according to the equation:

$$Q_{T\_switch} = \max(Q_{T\_serv}^1, Q_{T\_serv}^2, \ldots, Q_{T\_serv}^N)$$

Then, in step 34, the switching algorithm compares the overall quality target with the actual measured quality $Q_M$. For example, in WCDMA the actual measured quality can be based on the measured Common pilot channel (CPICH) Ec/No value. Based on the result of the comparison, a decision can be taken to switch on or off the dynamic receiver for the reception of the corresponding physical channel, on which the UE is receiving multiple services. For example, if the measured quality exceeds the overall quality target, i.e. $Q_M > Q_{T\_switch}$, then one branch could be switched off, but otherwise all branches could be switched on.

It will be noted that the UE does not directly dynamically reconfigure its receiver according to the most stringent service (e.g. the one with lowest BLER target). This is because the network may use a different coding scheme, or coding rate, or modulation method, or BLER targets on different services. This may lead to a situation where the lowest BLER may not correspond to the largest adjusted quality target. For this reason, it is advantageous that the UE independently derives the adjusted quality target for each service it is receiving, and then select the largest adjusted quality target ($Q_T$) for dynamically reconfiguring the receiver by comparing it with some measured quality. This will ensure that UE attempts to maintain the desired quality target on all the services it is simultaneously receiving.

An alternative scenario is that multiple services are received on multiple physical channels. For example, the UE may simultaneously receive N (N>1) point to multipoint MBMS services on physical channel #1 and M (M>1) point to multipoint MBMS services on physical channel #2.

There are two different ways to reconfigure the receiver, giving rise to two different embodiments as described below:

One possibility is to perform reconfiguration per physical channel, while another possibility is to perform aggregated reconfiguration.

Figure 4:
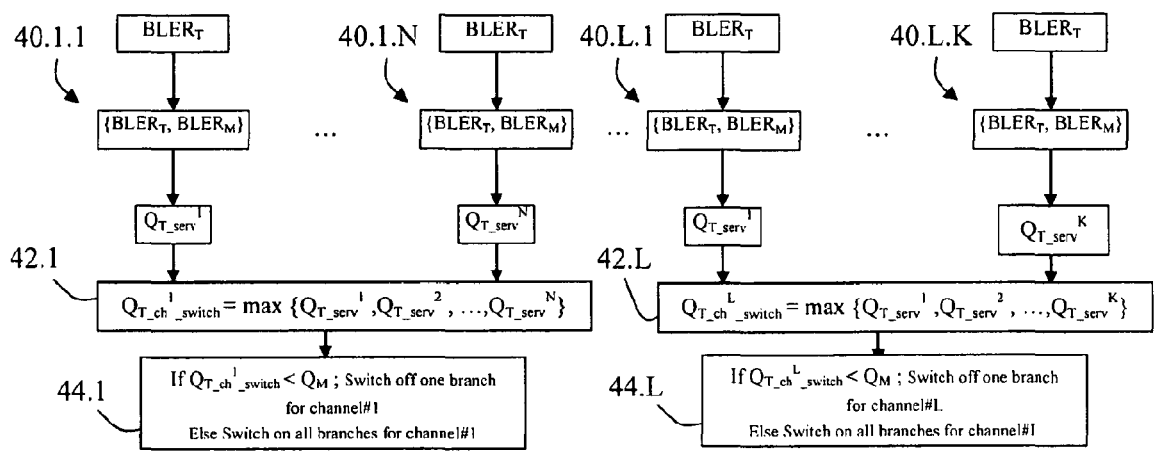
FIG. 4 illustrates dynamic receiver reconfiguration per physical channel according to the present invention.

In the case of dynamic reconfiguration per physical channel, the process performed in the UE is illustrated in FIG. 4.

In FIG. 4, the UE is receiving point to multipoint MBMS services on L physical channels, with N point to multipoint services on physical channel #1 and K point to multipoint MBMS services on physical channel #L.

Firstly, in steps 40.1.1, ..., 40.1.N respectively, the UE sets for each of the services $serv^1, \ldots, serv^N$ on channel #1 a respective quality target $Q_{T\_serv}^1, \ldots, Q_{T\_serv}^N$.

In step 42.1, the UE sets the overall quality target $Q_{T\_ch1\_switch}$ for channel #1 from the quality targets for each individual service, according to the equation:

$$Q_{T\_ch1\_switch} = \max(Q_{T\_serv}^1, Q_{T\_serv}^2, \ldots, Q_{T\_serv}^N)$$

A similar process is performed for each of the other channels. Thus, in general, in steps 40.L.1, ... 40.L.K respectively, the UE sets for each of the services $serv^1, \ldots, serv^K$ on channel #K a respective quality target $Q_{T\_serv}^1, \ldots, Q_{T\_serv}^K$.

In step 42.L, the UE sets the overall quality target $Q_{T\_chL\_switch}$ for channel #L from the quality targets for each individual service, according to the equation:

$$Q_{T\_ch^L\_switch} = \mathrm{Max}(Q_{T_{serv}}^1, Q_{T\_serv}^2, \ldots, Q_{T\_serv}^K)$$

Thus, the UE selects the largest adjusted quality target ($Q_{T\_switch}$) independently for each physical channel from the adjusted quality targets ($Q_{T\_service}$) of all services it is receiving on that physical channel. The UE will then dynamically reconfigure its receiver independently for each physical channel. Thus, in step 44.1, if the measured quality exceeds the overall quality target for channel #1, i.e. $Q_M > Q_{T\_ch1\_switch}$, then one branch could be switched off for channel #1, but otherwise all branches could be switched on. Similarly, in step 44.L, if the measured quality exceeds the overall quality target for channel L, i.e. $Q_M > Q_{T\_chL\_switch}$, then one branch could be switched off for channel #L, but otherwise all branches could be switched on.

This means that the UE may be using both receiver branches for receiving one physical channel, whereas it may be using only one receiver branch for receiving another physical channel.

As mentioned above, the alternative to reconfiguration per physical channel is aggregated dynamic reconfiguration, meaning that, when UE receives multiple services on multiple physical channels, it selects the largest adjusted quality target ($Q_{T\_switch}$) from the adjusted quality targets ($Q_{T\_serv}$) of all the services irrespective of the physical channel. This is represented by the equation:

$$Q_{T\_switch} = \max(Q_{T\_ch^1\_serv}^1, \ldots, Q_{T\_ch^1\_serv}^N, \ldots, Q_{T\_ch^L\_serv}^1, \ldots, Q_{T\_ch^L_{serv}}^K)$$

After deriving the final adjusted quality target ($Q_{T\_switch}$), the UE will dynamically reconfigure its receiver according to the same mechanism as described previously. That is, one receiver branch may be switched off if the measured quality exceeds the final adjusted quality target, but otherwise all branches will be switched on.

This aggregated dynamic reconfiguration arrangement is simpler from a UE implementation perspective, since the UE has to take one receiver reconfiguration switching decision irrespective of the number of received physical channels.

The preceding description has mainly focused on the dynamic UE receiver reconfiguration in the case where the UE receives multiple MBMS services namely MBMS point-to-multipoint Traffic Channel (MTCH) channels. The invention also holds good for other point to multipoint MBMS related channels such as the MBMS control channel (MCCH) and MBMS scheduling channel (MSCH). However, the most usual scenario is the one in which receiver diversity (or dual receiver branches) is mainly implemented for the reception of MTCH.

The dynamic receiver reconfiguration is found to be feasible for point to multipoint MBMS reception. However, the invention is equally valid for other channels such as dedicated channel (DCH), where almost always multiple transport channels, each associated with its quality target, are setup.

In E-UTRAN, single frequency MBMS (SFMBMS) may be used. In order to ensure good reception performance, all SFMBMS capable UEs are most likely to have dual receiver branches. This means that dynamic receiver reconfiguration is likely to be employed in SFMBMS-capable UEs. In SFMBMS, the UE receives only MBMS services at a time since the entire carrier is dedicated to the SFMBMS. This will conveniently allow the UE to receive multiple services simultaneously. Thus, the invention is also applicable to SFMBMS scenario when UE simultaneously receives multiple services.

The invention claimed is:

1. A method in a user equipment of simultaneously receiving at least two services or transport channels, using a receiver with at least two receiver branches, said method comprising:
   deriving a quality target for each of the simultaneously received services or transport channels mapped to one or more physical channels, based on corresponding network controlled quality of service targets;
   obtaining a measured quality for the one or more physical channels; and
   dynamically reconfiguring the receiver by switching on or off at least one of the receiver branches for the reception of the services or transport channels, based on a comparison between a largest one of the quality targets and the measured quality.

2. The method of claim 1, wherein all the received services or transport channels are mapped onto the same physical channel.

3. The method of claim 2, wherein the largest one of the quality targets used for dynamic receiver reconfiguration is the maximum of all the quality targets.

4. The method of claim 1, wherein the received services or transport channels are mapped onto more than one physical channel.

5. The method of claim 4, wherein the receiver reconfiguration is independently done on each physical channel.

6. The method of claim 5, wherein the largest one of the quality targets used for dynamic receiver reconfiguration on each physical channel is the maximum of all the quality targets of the services or transport channels mapped onto on the corresponding physical channel.

7. The method of claim 4, wherein the receiver reconfiguration is jointly done on all active physical channels.

8. The method of claim 7, wherein the largest one of the quality targets used for dynamic receiver reconfiguration is the maximum of all the quality targets of the services or transport channels mapped on all the active physical channels.

9. The method of claim 1, wherein the services are point to multipoint MBMS services.

10. The method of claim 9, wherein the transport channels are MTCH, MCCH or MSCH.

11. The method of claim 1, wherein the services are point-to-point DCH services.

12. The method of claim 11, wherein the transport channels are DCCH and DTCH.

13. A user equipment for simultaneously receiving at least two services or transport channels, comprising:
   a receiver having at least two receiver branches;
   a target derivation circuit configured to derive a quality target for each of the simultaneously received services or transport channels mapped to one or more physical channels, based on corresponding network controlled quality of service targets;
   a measuring circuit configured to obtain a measured quality for the one or more physical channels; and
   a reconfiguration control circuit configured to dynamically reconfigure said receiver by switching on or off at least one of said receiver branches for the reception of the said services, based on a comparison between a largest one of the quality targets and the measured quality.

14. The user equipment of claim 13, wherein the reconfiguration control circuit is configured to perform receiver reconfiguration independently for each physical channel on which said services are received.

15. The user equipment of claim 13, wherein the reconfiguration control circuit is configured to perform receiver reconfiguration jointly on all active physical channels.

* * * * *

UNITED STATES PATENT AND TRADEMARK OFFICE
CERTIFICATE OF CORRECTION

PATENT NO. : 8,422,384 B2
APPLICATION NO. : 12/597667
DATED : April 16, 2013
INVENTOR(S) : Kazmi It is certified that error appears in the above-identified patent and that said Letters Patent is hereby corrected as shown below:

In the Specification

In Column 2, Line 15, delete "network" and insert -- the network --, therefor.

In Column 2, Line 17, delete "point" and insert -- the point --, therefor.

In Column 2, Line 55, delete "user at a time" and insert -- the user --, therefor.

In Column 2, Line 56, delete "service," and insert -- service at a time, --, therefor.

In Column 2, Line 61, delete "usual" and insert -- the usual --, therefor.

In Column 3, Line 23, delete "comprises, the additional steps of" and insert -- comprises the additional steps of: --, therefor.

In Column 6, Line 9, delete "$Q_{T\_ch1\_switch}$" and insert -- $Q_{T\_ch^1\_switch}$ --, therefor.

In Column 6, Line 18, delete "$Q_{T\_chL\_switch}$" and insert -- $Q_{T\_ch^L\_switch}$ --, therefor.

In Column 6, Line 20, delete "$Q_{T\_ch^L\_switch} = \text{Max}(Q_{T\_serv}^1, Q_{T\_serv}^2, \ldots, Q_{T\_serv}^K)$" and insert -- $Q_{T\_ch^L\_switch} = \max(Q_{T\_serv}^1, Q_{T\_serv}^2, \ldots, Q_{T\_serv}^K)$ --, therefor.

In Column 6, Line 28, delete "$Q_M > Q_{T\_ch1\_switch}$," and insert -- $Q_M > Q_{T\_ch^1\_switch}$, --, therefor.

Signed and Sealed this
Twenty-third Day of September, 2014

Michelle K. Lee
*Deputy Director of the United States Patent and Trademark Office*

CERTIFICATE OF CORRECTION (continued)
U.S. Pat. No. 8,422,384 B2

In Column 6, Line 31, delete "$Q_M > Q_{T\_chL\_switch}$," and insert -- $Q_M > Q_{T\_ch}{}^L{}_{\_switch}$, --, therefor.